Jan. 7, 1930.　　　G. KOMP, SR　　　1,742,994
ICE SCORING MACHINE
Filed July 30, 1928　　3 Sheets-Sheet 1

George Komp Sr.
Inventor
By C.A.Snow&Co.
Attorneys.

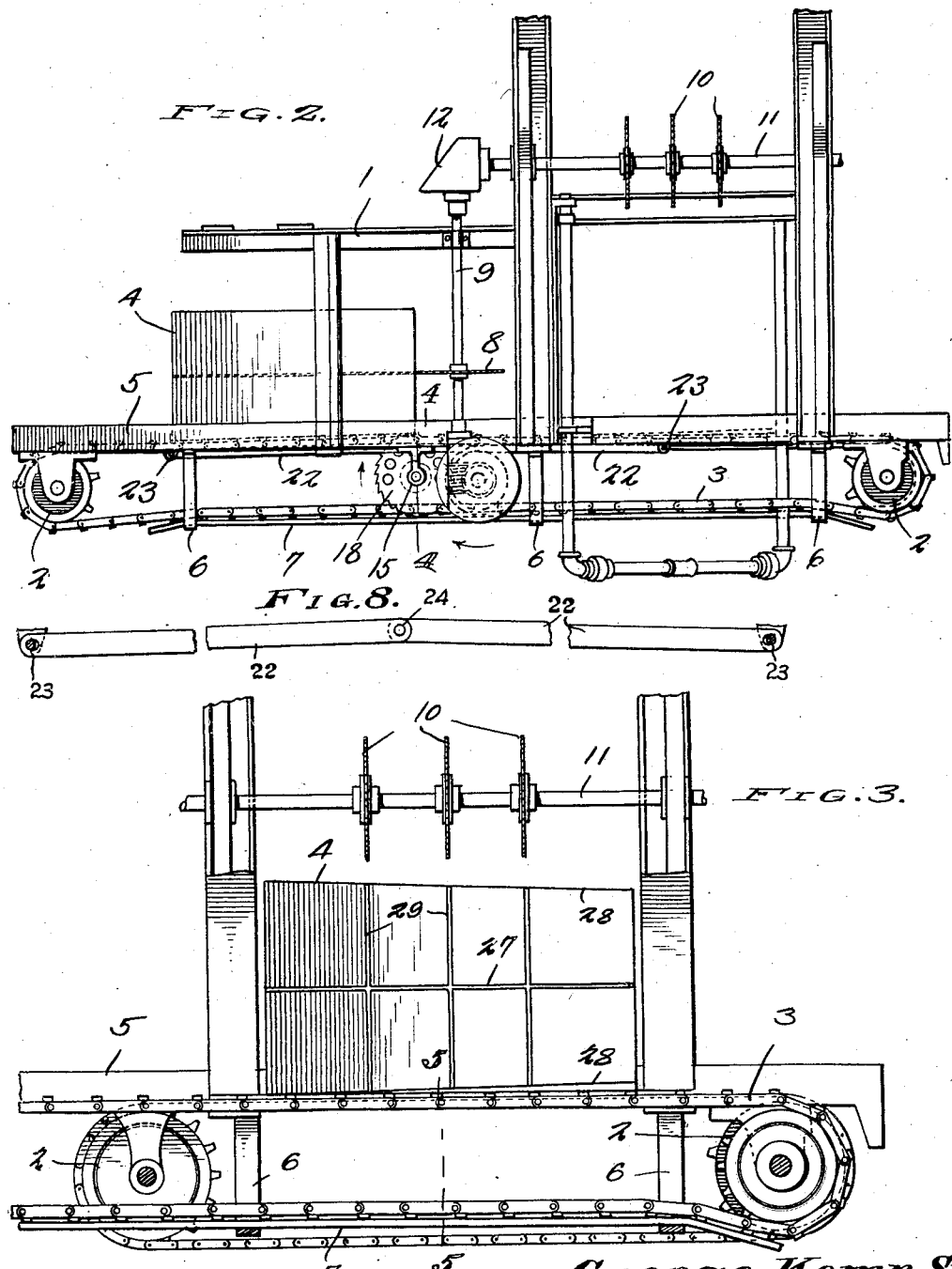

Jan. 7, 1930.  G. KOMP, SR  1,742,994
ICE SCORING MACHINE
Filed July 30, 1928   3 Sheets-Sheet 3
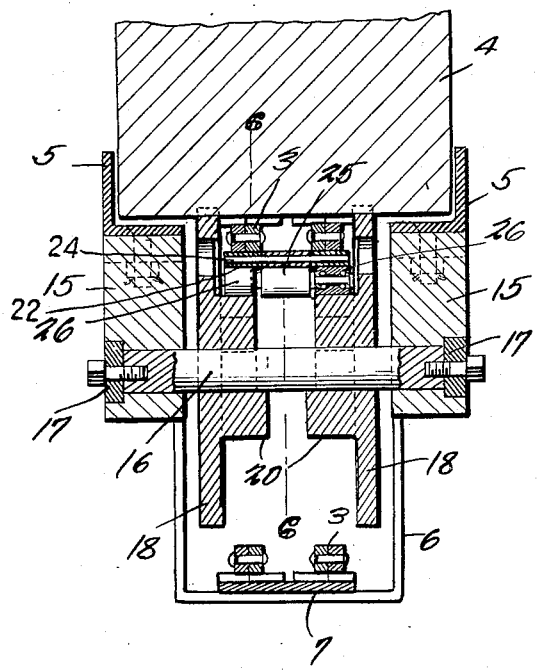
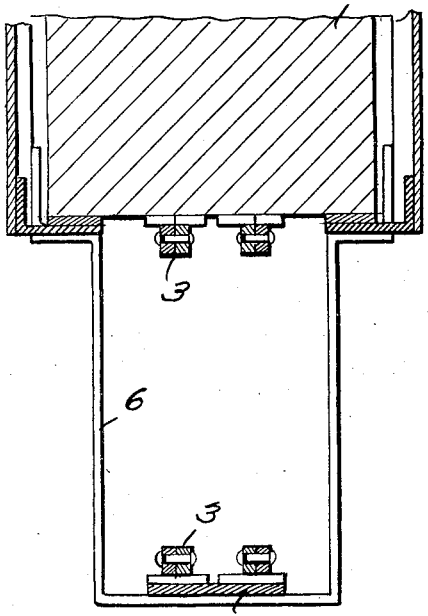
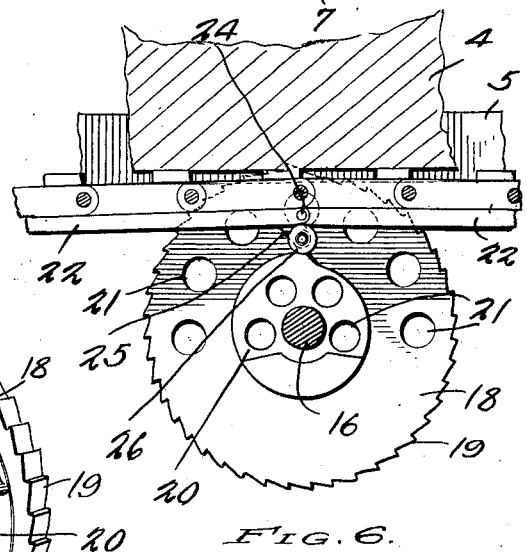
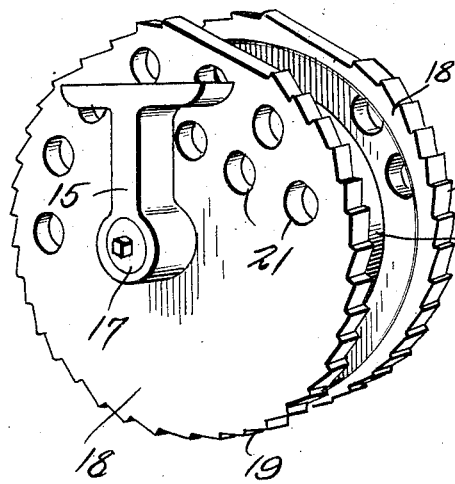
George Komp, Sr.
Inventor Patented Jan. 7, 1930

1,742,994

UNITED STATES PATENT OFFICE

GEORGE KOMP, SR., OF HATTIESBURG, MISSISSIPPI

ICE-SCORING MACHINE

Application filed July 30, 1928. Serial No. 296,197.

By way of explanation, it may be stated that a cake of ice as it comes out of an ice can in a refrigerating plant, generally has a taper from one end of the other. If a cake of ice is scored, parallel to one edge of the cake, the taper is not fairly distributed, among the several chunks into which the cake is divided, and some chunks will be considerably smaller than others. The foregoing being understood, one object of this invention is to provide a means whereby, when a cake of ice is moved lengthwise with respect to a scoring instrumentality, it may be moved transversely, as well, thereby to compensate for the taper in the cake.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 2 is a fragmental side elevation showing the cake as it is being advanced to be scored lengthwise;

Figure 3 is a fragmental side elevation showing the cake after it has been scored, both lengthwise and crosswise and been lowered again on the conveyor;

Figure 4 is a cross section on the line 4—4 of Figure 2;

Figure 5 is a section on the line 5—5 of Figure 3;

Figure 6 is a section on the line 6—6 of Figure 4;

Figure 7 is a perspective view showing the device that lowers the cake to compensate for the scoring;

Figure 8 is an elevation of the supports, parts being broken away.

Figure 1:
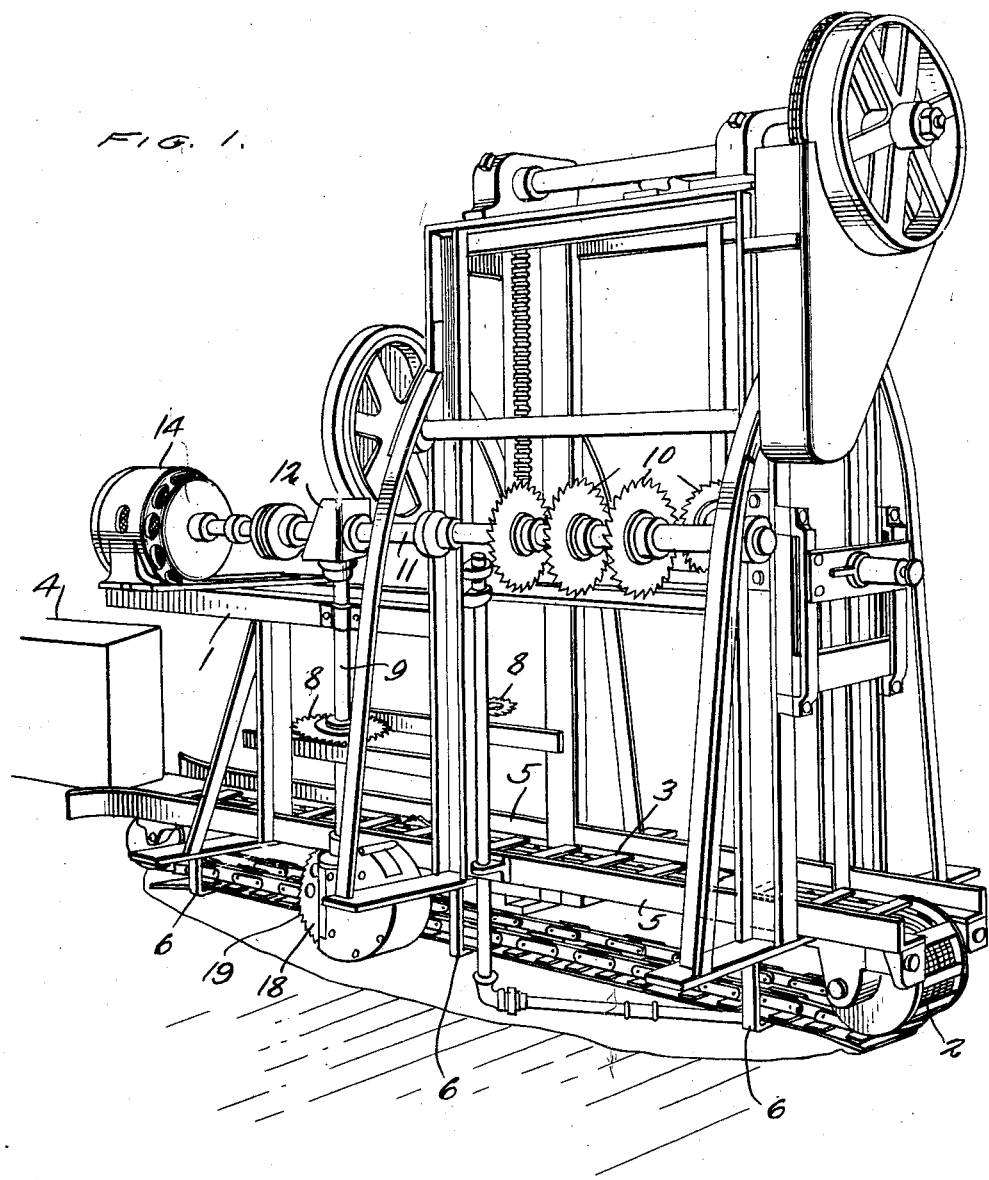
Figure 1 shows in perspective, an ice scoring machine to which the device forming the subject matter of this application has been applied.

The device forming the subject matter of this application may be embodied in machines of various kinds, but in Figure 1, by way of illustration, there has been shown an ice scoring machine which will be described with considerably brevity, since most of the construction of the machine has nothing to do with the present invention. Let it suffice to state that the scoring machine shown in Figure 1 includes a frame 1 carrying a sprocket wheel 2 traversed by a chain conveyor 3. The block 4 of ice enters the machine at the left hand end in Figure 1, and is carried along by the conveyor 3, between guides 5, the lower run of the chain conveyor 3 being supported on a track 7 carried by yokes 6 from the framework of the machine.

As the block 4 of ice is moved along horizontally by the conveyor 3, the block comes into contact with a hoizontal saw 8, and is scored lengthwise, the saw 8 being carried by a vertical shaft 9 journaled in the frame 1. The block of ice, having been scored lengthwise, is raised, and is scored cross-wise by vertical saws 10 on a horizontal shaft 11 journaled in the frame of the machine, the shafts 9 and 11 being operatively connected at 12, so that they can be driven by a suitable source of power shown at 14. After the ice has been scored by the saws 10, it is lowered and carried out of the right hand end of the machine by the conveyor 3. It is with such a machine, or with a similar machine, that the device forming the subject matter of this application is assembled.

In carrying out the invention, a pair of depending bearing brackets 15 are mounted on the guides 5 (or elsewhere). A horizontal shaft 16 is held for rotation, as at 17, in the brackets 15. Wheels 18 are secured to the shaft 16 eccentrically thereof, the wheels 18 being provided with peripheral teeth 19. The wheels 18 may be spaced apart somewhat, as shown in Figure 4, and on their inner sides, they are provided with cams 20. Both the cams 20 and the wheels 18 have holes 21.

By means of the holes 21, or otherwise, the weight is so distributed in the wheels 18 that after the cake of ice has passed over the wheels, the wheels will tend to drop back by gravity into the position shown in Figure 7 so as to be ready to lower another cake of ice, during the scoring of the cake.

Oppositely extending supports 22 are provided and they are loosely pivoted at their outer ends, at 23, upon the framework of the scoring machine. The inner ends of the supports 22 are pivotally connected together as shown at 24. On the inner end of one of the supports 22 there is a bracket 25 on which rollers 26 are journaled and these rollers turn in contact with the cams 20.

In practical operation, the conveyor 3 advances the cake of ice 4 horizontally toward the scoring saw 8. The cake of ice engages the teeth 19 at the highest point of the wheels 18 and rotates the wheels about a horizontal axis represented by the shaft 16. When the wheels 18 are rotated, they rotate the cams 20, and the cams 20, cooperating with the rollers 26, lower the supports 22. Thus, as the cake of ice moves along by the saw 8, the cake is lowered gradually, as the conveyor chain 3 traverses the left hand support 22 in Figure 6.

Thus, the scoring line, marked by the numeral 27 in Figure 3, is marked symmetrically with respect to the opposite, inclined, longitudinal edges 28 of the ice cake 4. This completes the operation, so far as the present invention is concerned, but as a matter of practice, after the scoring line 27 has been made, the cake of ice is raised, and then lowered on the conveyor 3, and carried off the right hand end of the machine in Figure 1. During the raising of the cake 4, as aforesaid, the transverse lines 29 are formed by the vertical saws 10.

What is claimed is:—

1. In an ice scoring machine, a scorer, means for advancing a cake of ice past the scorer, and means operated by the advancing cake for moving the said cake transversely of its line of advance, thereby to cause the scorer to score the cake symmetrically with respect to the opposite outer surfaces of the cake.

2. In a device of the class described, a rotary member, means for supporting the rotary member for turning movement in the path of a moving cake of ice, and mechanism operated by the rotary member for moving the cake of ice transversely of its line of advance.

3. In a device of the class described, a rotary member, means for supporting the rotary member for turning movement in the path of a moving cake of ice, a cam movable with the rotary member, and means operated by the cam for moving a cake of ice transversely of its line of advance.

4. In a device of the class described, a conveyor, a conveyor support, a rotary member engageable with a cake of ice on the conveyor, and means operated by the rotary member for shifting the conveyor support and the conveyor transversely.

5. In a device of the class described, an eccentric wheel supported for rotation, and having means for engaging a moving cake of ice, whereby the cake may rotate the wheel, and means operated by the wheel for moving the cake of ice transversely of its line of advance.

6. In a device of the class described, an eccentrically mounted wheel toothed for engagement with a moving cake of ice, a cam rotatable with the wheel, a pivotally mounted support engaged with the cam, whereby the cam will raise and lower the support, and an ice conveyor movable along the support and so located as to carry a cake of ice into contact with the toothed wheel.

In testimony that I claim the foregoing as my own, I have hereto affixed my signature.

GEORGE KOMP, Sr.